Jan. 4, 1927.
T. H. THOMAS
1,612,892
EMERGENCY VALVE DEVICE
Filed Feb. 6, 1925
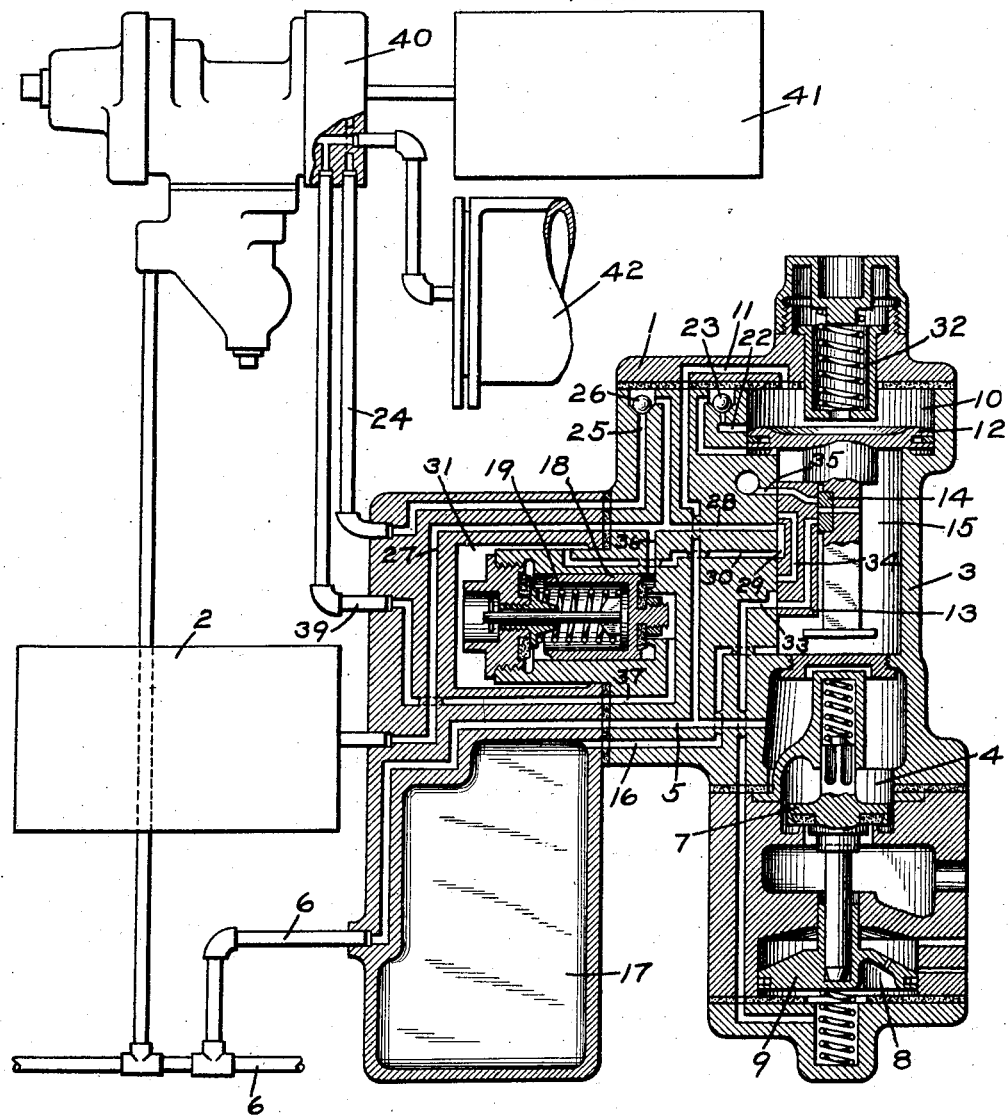
INVENTOR
THOMAS H. THOMAS
BY *Wm. M. Cady*
ATTORNEY Patented Jan. 4, 1927.

1,612,892

UNITED STATES PATENT OFFICE.

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

EMERGENCY-VALVE DEVICE.

Application filed February 6, 1925. Serial No. 7,205.

This invention relates to fluid pressure brakes and more particularly to a brake apparatus for securing a high pressure in an emergency application of the brakes.

According to the construction disclosed in a pending application of Clyde C. Farmer, Serial No. 714,993, filed May 21, 1924, means are provided for securing a high brake cylinder pressure in an emergency application of the brakes, and wherein the pressure is built up at a slow rate.

It may be desirable under certain conditions, to build up the brake cylinder pressure at a rapid rate, when an emergency application of the brake is effected.

The principal object of my invention is to provide means for securing a rapid rate of build up of brake cylinder pressure in an emergency application of the brakes.

In the accompanying drawing, the single figure is a diagrammatic view of a brake apparatus embodying my invention and showing the emergency portion in section.

As shown in the drawing, the brake apparatus may comprise a triple valve device 40, an auxiliary reservoir 41, a brake cylinder 42 and a vent valve device 1.

The vent valve device 1 shown in the drawing is similar to that disclosed in the pending application of Clyde C. Farmer, hereinbefore referred to, and comprises a casing having a valve chamber 4 connected by passage 5 to the brake pipe 6 and containing a brake pipe vent valve 7. A piston chamber 8 also incorporated in the casing 3 contains a quick action piston 9, which is adapted to operate the vent valve 7.

Also provided in the casing 3 is a piston chamber 10 connected by passage 11 to the brake pipe 6 and containing a piston 12, which is adapted to operate a slide valve 13 and an auxiliary slide valve 14 contained in a valve chamber 15, the valve chamber 15 being connected by passage 16 to the quick action chamber 17.

For controlling the supply of fluid from the supplemental reservoir 2 to the brake cylinder 42 a valve piston 18 is provided, which is adapted to seat upon extreme movement in either direction and which is subject on one side to the pressure of a spring 19.

In operation, fluid under pressure from the brake pipe 6 flows to the valve chamber 4 and to the piston chamber 8 through passages 5 and 11. Fluid from piston chamber 8 flows through passage 22 past ball check 23 to valve chamber 15, thence through passage 16 to the quick action chamber 17, charging the same. The supplemental reservoir 2 is charged, through pipe 24, passage 25, past ball check 26, and passage 27, the pipe 24 being connected to a triple valve device 40 and charged with fluid under pressure, as in the previous mentioned application of Clyde C. Farmer.

With the slide valve 13 in release position, as shown in the drawing, the supplemental reservoir 2 is connected to chamber 31, which is open to the spring slide of valve piston 18, by way of passages 27 and 28, cavity 29 in slide valve 13, and passage 30.

The pipe 39 which leads to the brake cylinder 42 is connected by passage 37 to the inner seated area of the valve piston 18, while the outer seated area is open to the supplemental reservoir 2.

Upon a sudden reduction in brake pipe pressure, the piston 12 will be moved outwardly, compressing the spring 32 and shifting the slide valve 13 to uncover port 33, thereby permitting fluid under pressure from the quick action chamber 17 to flow to piston chamber 8 and force the quick action piston 9 upwardly. The upward movement of piston 9 will unseat the vent valve 7, so as to cause a quick serial venting of the brake pipe in the usual manner.

The shifting of the slide valve 13 also causes the cavity 34 to connect port 30 with an atmospheric port 35, thereby venting the fluid from chamber 31 and the spring side of valve piston 18. The venting of the fluid from the spring side of the valve piston 18 permits the pressure of fluid from the supplemental reservoir, acting on the exposed area of the opposite side to unseat said valve piston, against the force exerted by spring 19, thereby opening communication from the supplemental reservoir to the brake cylinder, through passages 27, 36, past unseated valve piston 18, thence through passage 37 and pipe 39 to the brake cylinder.

The almost simultaneous movement of the valve piston 18 with the movement of the slide valve 13 permits the immediate flow of fluid from the supplemental reservoir to the brake cylinder, in addition to and before equalization of the usual supply of fluid from the auxiliary reservoir 41 of the triple valve 40, so that a high pressure is quickly secured in the brake cylinder as soon as an emergency application of the brakes is initiated.

Having now described my invention, what I claim as new and desire to secure by Letters Patent, is:—

1. In a fluid pressure brake, the combination with a brake pipe, brake cylinder, means for supplying fluid to the brake cylinder upon a gradual reduction in brake pipe pressure and a source of fluid under pressure, of valve means normally subject on opposite sides to fluid under pressure for controlling the supply of fluid from said source to the brake cylinder and an emergency valve device operated upon a sudden reduction in brake pipe pressure for directly venting one side of said valve means to the atmosphere to thereby operate said valve means to quickly supply fluid from said source to the brake cylinder.

2. In a fluid pressure brake, the combination with a brake pipe, brake cylinder, means for supplying fluid to the brake cylinder upon a gradual reduction in brake pipe pressure and a source of fluid under pressure, of valve means normally subject on one side to fluid pressure and on the other side to fluid pressure and the pressure of a spring for controlling the supply of fluid from said source to the brake cylinder and an emergency valve device operated upon a sudden reduction in brake pipe pressure for venting the spring side of said valve means directly to the atmosphere to thereby effect the prompt opening of said valve means and thereby the quick admission of fluid from said source to the brake cylinder.

3. In a fluid pressure brake, the combination with a brake pipe, brake cylinder, means for supplying fluid to the brake cylinder upon a gradual reduction in brake pipe pressure and a source of fluid under pressure, of valve means normally subject on one side to fluid pressure and on the other side to fluid pressure and the pressure of a spring for controlling the supply of fluid from said source to the brake cylinder and an emergency valve device comprising a piston subject to brake pipe pressure and a slide valve operated by said piston upon a sudden reduction in brake pipe pressure for directly connecting the spring side of said valve means to an atmospheric exhaust port, to thereby operate said valve means and effect the quick admission of fluid from said source to the brake cylinder.

In testimony whereof I have hereunto set my hand.

THOMAS H. THOMAS.